Patented Nov. 20, 1945

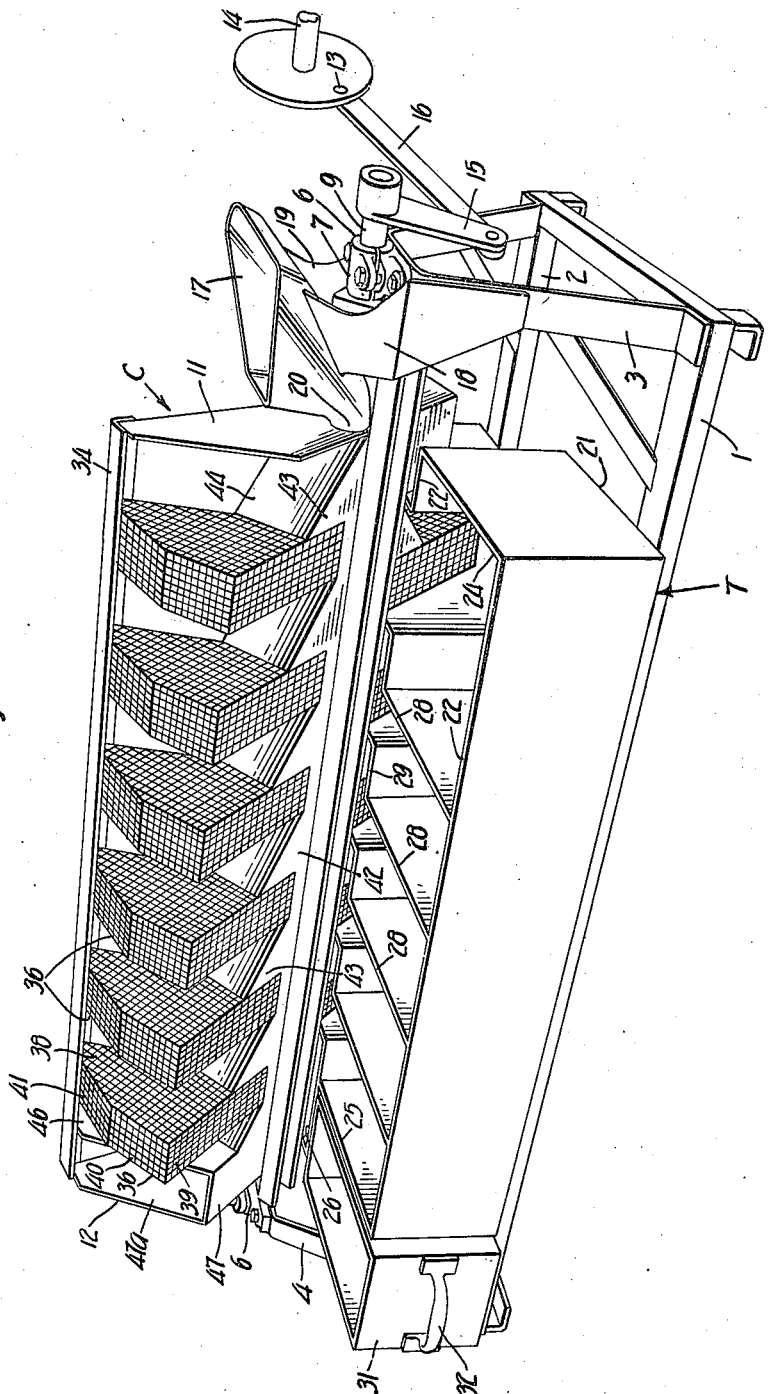

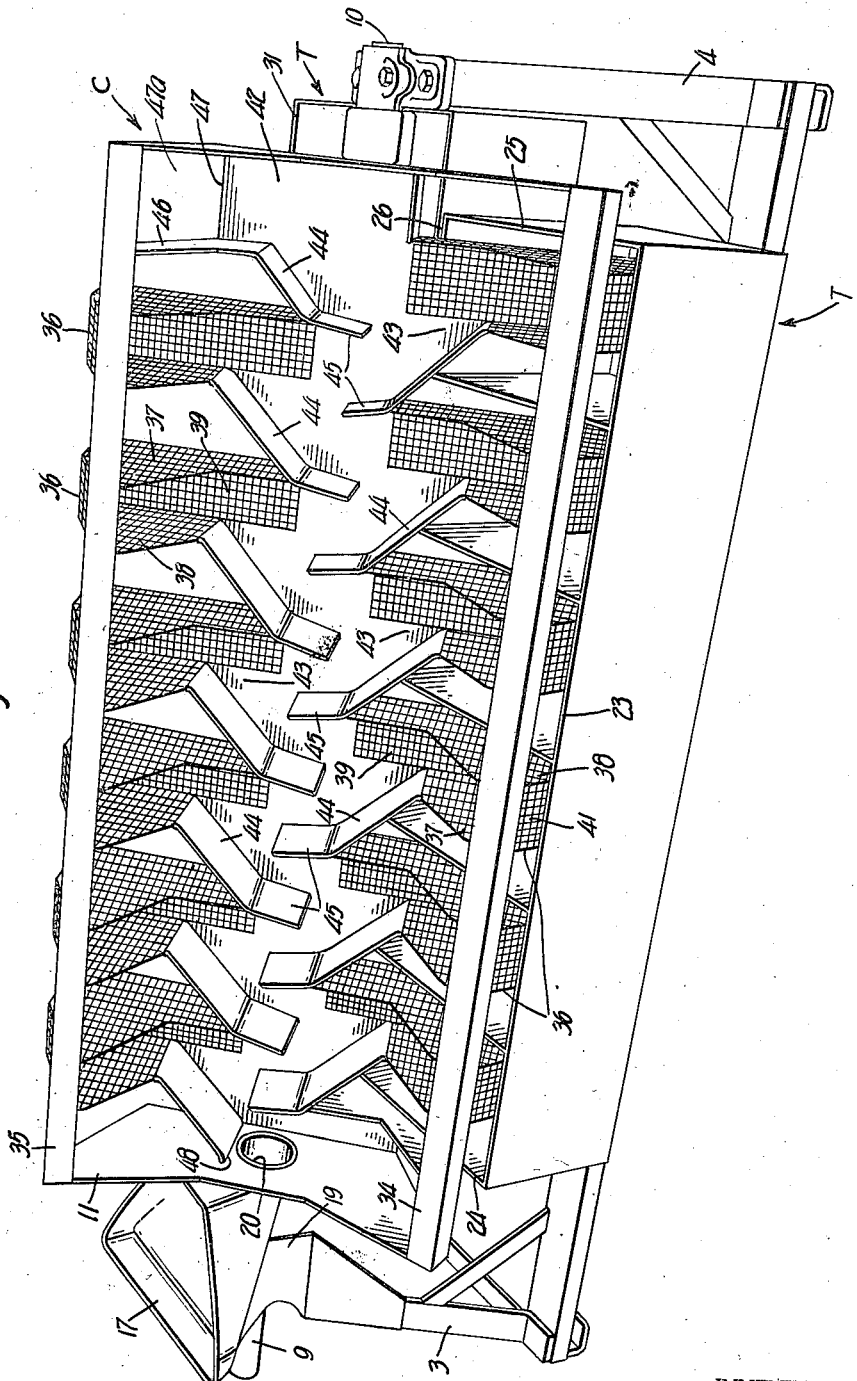

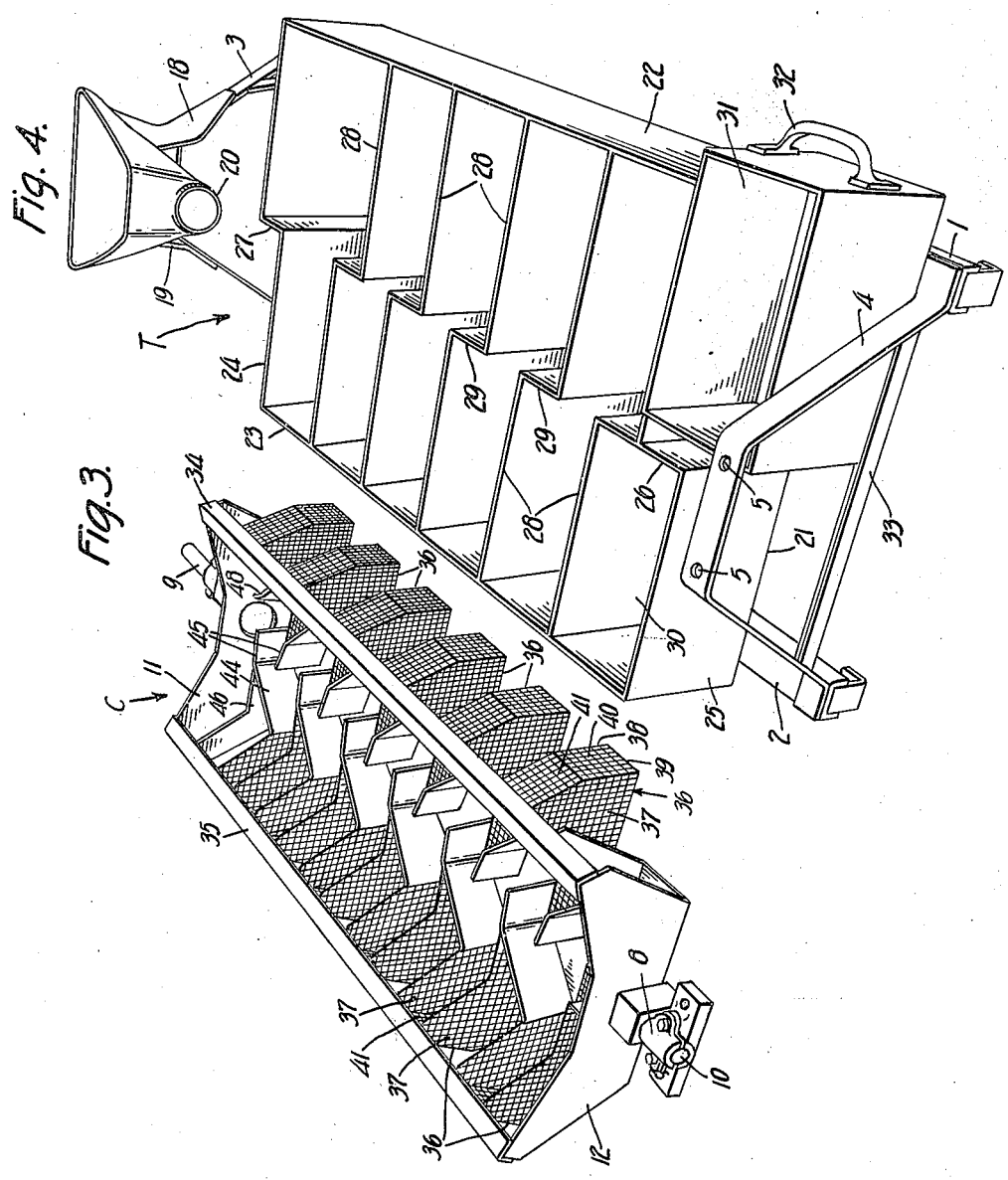

2,389,337

UNITED STATES PATENT OFFICE 2,389,337

ARTICLE TREATING MACHINE

Erich R. Zademach, Elizabeth, N. J., assignor, by mesne assignments, to Metalwash Machinery Company, Newark, N. J., a copartnership Application November 16, 1940, Serial No. 365,938

16 Claims. (Cl. 134—66)

An object of this invention is to provide a machine for dipping articles to be treated into a series of tanks one after the other, the tanks containing the treating liquids and in which the time of treating may be regulated to a definite interval.

A further object is to provide a novel conveyer system for articles to be treated in which the articles are quickly transferred from one treating solution to the next with a minimum time of exposure of the articles to the air.

A still further object is to provide a novel conveyer system for use in transferring articles from one tank of solution to another with a minimum transfer of solution from one tank to the succeeding tank.

A cognate object is to provide a novel form of tiltable conveyer system for the transfer of articles from one compartment to another and in which compartments operations such as drying, washing, annealing etc. may be effected.

Other and further objects of the invention will become apparent as the description thereof proceeds. For a better understanding of the invention, reference is made to the embodiment illustrated in the accompanying drawings, in which;

Fig. 1 is a perspective view of a dipping machine taken from the front;

Fig. 2 is a perspective view of the machine taken from the rear;

Fig. 3 is a perspective view showing the conveyer portion of the machine; and

Fig. 4 is a perspective view showing the tank portion of the machine.

The machine comprises in general two main portions, the tank or compartment portion T and the conveyer portion C. A suitable framework is provided for supporting these main portions in assembled relation, that shown comprising the horizontal connecting rails 1 and 2, upon which rest the tanks T and the inverted V shaped end members 3 and 4 which are bored as at 5 to receive the bolts 6 which secure the journal bearings 7 and 8 in position on the supporting frame. The short shafts 9 and 10 which support the conveyer for free oscillatory movement are journalled in bearings 7 and 8, these shafts being secured to the end walls 11 and 12 of the conveyer element. Any suitable means either for hand or power operation may be provided to oscillate the conveyer, the arrangement shown comprising a crank pin 13 operated by a power shaft 14 and connected to a crank arm 15 secured to shaft 9 by a pitman 16. Instead of crank pin 13, the outer end of pitman 16 could be driven by a cam designed to retain the articles in one or more of the tanks for any desired time. End frame member 3 also serves to support a hopper 17 provided with supporting legs 18 and 19, the hopper having a discharge or mouth portion 20 emptying into the end of conveyer C.

As shown more clearly in Figs. 1 and 3, tank T comprises a bottom wall or plate 21, vertical side walls 22, 23 and end walls 24, 25, the latter having the longitudinal offset portions 26 and 27. A plurality of partition plates 28 each having a central offset portion 29 are secured to the side walls 22 and 23 so as to divide the tank into a plurality of watertight subdivisions. Offset portions 26 and 29 of the end partition are united so that a container 30 is formed at one end which extends only half way across the tank and is a watertight receptacle. A separate receptacle in the form of a drawer 31 having the handle 32 is mounted at the end of the tank, as shown, supported on frame members 1 and 33.

The conveyer which transports the articles from one tank portion to another comprises a pair of longitudinal angle irons 34, 35 which are secured to the outer ends of end members 11 and 12 and which support a plurality of spaced apart containers or baskets 36, the baskets secured to angle iron 34 being mounted opposite the spaces between those secured to iron 35. Each basket is preferably formed of wire mesh, as shown, or of perforated metal. Each basket has vertical end walls 37, 38 which are connected by a horizontal bottom wall 39, and an end wall comprising a vertical portion 40 terminating in an upwardly inclined portion 41. A horizontal plate 42 extends along the bottom of the conveyer and has extending portions 43 tapered as shown in Fig. 2 directed toward the inwardly open ends of the baskets and the vertical end wall of one basket is connected to the adjacent end wall of the next basket by a deflecting plate 44 which has an extending portion 45 serving as a baffle. The end deflecting plate 44 terminates in a plate 46 parallel to the end wall 12 and forming with the latter and an extension 47 provided at one end of plate 42, a discharge chute 47a, as clearly shown in Fig. 1. The deflecting plate 44 at the inlet end abuts against end wall 11 near the hopper outlet 20 as shown at 48 in Fig. 2, so as to direct the articles placed in hopper 17 into the end basket.

The entire conveyer structure and tank may be made of any suitable material such as acid resisting metals or the tank may be made of steel lined with rubber. Any known form of variable speed drive may be employed to rotate shaft 14 in order to secure the desired immersion time in the acid or other reagent.

Operation

Before starting the machine, the desired liquid reagents for treating the articles are poured into the several sections of the tank. Upon rotation of shaft 14 and the placing of a number of the articles in hopper 17 upon the first lowering of the end basket into its tank, end plate 44 will direct them into the basket where the liquid will act on them while they are immersed therein. This time of immersion may be controlled by the speed at which shaft 14 is rotated and will obviously depend on the article, and the composition of the liquid. Upon the elevation of the end basket above its liquid the articles will be tumbled out and guided by baffle plate 45 and deflecting plate 44 into the next basket on the opposite side of the conveyer which has entered the liquid in its tank. This liquid may be the same as that in the previous tank or different, if the two tank sections are separated by a dividing wall. The liquid here may be water for rinsing the reagent used in the first tank from the articles or it may be a reagent which reacts chemically on the articles. This action is repeated, the articles being transferred from tank to tank until they are tumbled onto end deflection plate 44 and directed by chute 47a into drawer 31, from which they may be easily removed. More or fewer tanks and baskets may be provided, depending on the nature of the process and the articles under treatment.

As an example of the use of the machine for acid dipping of steel articles for the removal of surface scale, the end tank may contain a hot caustic soda solution, tank 2 water, tank 3 a hot solution of sulphuric acid, tank 4 water, tank 5 a neutralizing solution of hot alkali and tank 6 boiling water. Or the machine may be used for giving brass or other related alloyed metals a bright finish by removing surface-oxidation by employing known reagents in the proper order in the several tank sections. In treating such articles, one of the tank sections may be left vacant so that the excess acid used in the preceding tank will be deposited from the articles into it and may be recovered.

The machine may be employed for other uses than the dipping of metal articles, the conveyer arrangement being suitable for advancing the work in a washing or drying or annealing machine or in any other type of machine. In the case of washing, spray pipes may be installed above the dip table so that the cleaning reagent or water is sprayed onto the articles as they are tumbled and advanced through the machine. For drying, hot air blow pipes may be installed instead.

In operation the work is quickly tumbled from one basket to the next so that no oxidation due to exposure to the air results and also by combining a tumbling motion with that of dipping, the time of pickling or bright dipping is reduced, resulting in an increased output for the machine as against known methods of dipping. In treating small metal articles it was found that the tilting action caused the top layer to slide off first and become the bottom layer in the next basket.

It will be understood that steam coils may be installed for heating the reagents in certain of the tanks when desired, while cooling coils may be used in other cases. A hood or cover may be provided over the machine to carry off the fumes generated and this may be subdivided to provide a separate compartment over one or more of the tank sections.

I have described what I believe to be the best embodiments of my invention. I do not wish, however, to be confined to the embodiments shown, but what I desire to cover by Letters Patent is set forth in the appended claims.

I claim:

1. In a tumbling machine for treating material, the combination of a conveyer having an axis, a plurality of pockets secured to said conveyer on one side of said axis, a plurality of pockets secured to the conveyer on the other side of said axis, means for causing the material to pass from a pocket on one side of said axis to one on the opposite side thereof upon oscillation of said conveyer, tanks adapted to contain treating fluids and disposed in the paths of certain of said pockets and means for oscillating said conveyer.

2. In a machine for treating material, the combination of a conveyer having a series of spaced apart pockets disposed on one side of an axis and a second series of spaced apart pockets on the other side of the axis and the pockets of the second series being located opposite the spaces between the pockets of the first named series, driving means for oscillating the conveyer about the axis and means for causing material in a pocket of the first series when elevated by said driving means to pass into the next adjacent pocket of said second named series and tanks adapted to contain treating fluids and disposed in the paths of certain of said pockets.

3. In a machine for treating material, the combination of a conveyer having a longitudinal axis, a plurality of spaced apart pockets mounted on said conveyer on one side of said axis and a plurality of spaced apart pockets on the other side of said axis, means for charging material into the end one of said pockets, means for transferring the material in succession from one pocket to another along the length of said conveyer and means for oscillating said conveyer through an angle of less than 360 degrees.

4. In a machine for treating material, the combination of a conveyer mounted for oscillation on an axis, at least two spaced apart baskets secured to said conveyer on one side of said axis, a basket secured to said conveyer at the other side of said axis directly opposite the space between said baskets, a deflecting plate mounted at the inner end of said basket and sloped to direct material from one of said two baskets into said basket, a deflecting plate mounted at the inner end of the other of said two baskets and sloped to direct material from said opposite basket thereinto, tanks adapted to contain fluids for treating the material mounted below and in the paths of said baskets and means for oscillating said conveyer through an angle less than 360 degrees.

5. In a machine for treating material, the combination of a conveyer mounted for oscillation on an axis, a series of spaced apart pockets mounted in alignment on said conveyer at one side of said axis, a second series of spaced apart pockets mounted in alignment on said conveyer at the other side of said axis and disposed opposite the spaces between the pockets of the first series, each of said pockets having a deflecting plate mounted at its inner end and sloped toward the next adjacent pocket of the other series, means for charging the material into the end pocket of one series, tanks adapted to contain treating fluids and disposed in the paths of certain of said pockets and means for oscillating said conveyer.

6. The arrangement of claim 5 in which one side of the conveyer near its end is provided with a discharge opening adapted to receive the material from a pocket disposed on the other side of the conveyer and to discharge the material from the conveyer.

7. In a machine for treating material, the combination of a conveyer mounted for oscillation on an axis, a series of spaced apart pockets mounted in alignment on said conveyer at one side of said axis, a second series of spaced apart pockets mounted in alignment on said conveyer at the other side of said axis and disposed opposite the spaces between the pockets of the first series, each of said pockets being provided with a plate at its inner end which slopes toward the next adjacent pocket of the other series, an inlet opening at one end of said conveyer to pass the material into an end pocket, an outlet opening at the opposite end of said conveyer, a deflecting plate arranged to direct the material leaving a pocket into said outlet opening, tanks adapted to contain treating fluids and disposed in the paths of certain of said pockets and means for oscillating said conveyer through an angle less than 360 degrees.

8. In a machine for treating material, the combination of a conveyer having oppositely disposed end plates, a short shaft secured to each of said end plates, a supporting frame having a pair of longitudinal members, journal bearings mounted at the ends of said supporting frame and arranged to support said shafts, longitudinally extending members connected to the upper portions of said end plates, a series of spaced apart pockets having their upper ends connected to one of said connecting members, a second series of spaced apart pockets having their upper ends connected to the other of said connecting members, the pockets of one series being disposed opposite the spaces between the pockets of the other series, a vertically arranged plate disposed at the inner end of each of the pockets and making an acute angle with the axis of the conveyer, a plurality of tanks adapted to contain the desired treating fluids and disposed along said longitudinal frame members and means for oscillating said conveyer.

9. The arrangement of claim 8 in which a discharge outlet is provided near one end of said conveyer and a receptacle is mounted on one of said longitudinal frame members under said discharge outlet.

10. In a tumbling machine for treating material, the combination of a conveyer mounted for oscillation about a substantially horizontal axis, tanks disposed under the conveyer at different distances from the end thereof, said conveyer having a first pocket adapted to hold the material and in lowered position to enter one of said tanks, and a second pocket adapted in lowered position to enter another of the tanks, means disposed on said conveyer to cause the material leaving the first pocket to be discharged into the second pocket in response to the elevation of the first pocket above the level of the second pocket, and means for oscillating the conveyer about said horizontal axis.

11. In a tumbling machine for treating material, the combination of a conveyor, tanks disposed under the conveyor at different distances from the end thereof, said conveyor having a first pocket adapted to hold the material and to enter one of said tanks, and a second pocket adapted to enter another of the tanks, means disposed on said conveyor to cause the material leaving the first pocket to be discharged into the second pocket in response to the elevation of the first pocket above the level of the second pocket and means connected to the conveyor for angularly oscillating the said pockets in planes transverse to the direction in which said tanks follow each other so as to cause the second pocket to enter its tank as the first pocket is leaving its tank.

12. In a machine for treating material, the combination comprising two substantially horizontal opposed rows of containers, means for elevating the containers of one row with respect to the next advanced container of the other row, and means operable when a container of one row is elevated with respect to the next advanced container of the other row for discharging the material from said elevated container into said next advanced container, whereby said material can be made to follow a zig-zag course between the two rows.

13. In a machine for treating material, the combination comprising a plurality of containers, means for supporting said containers for oscillatory angular movement in substantially parallel planes, said containers being juxtaposed in a direction transverse to said planes, so that each container can be tilted above the next adjacent container, whereby the material is discharged by gravity from said tilted container, and means for deflecting the material into said adjacent container while it is in lowered position.

14. In a machine for treating material, the combination comprising a series of containers arranged substantially horizontally with the outlet side of one staggered with respect to the inlet side of the adjacent container, means for guiding the material between adjacent containers, and means for oppositely and alternately raising and lowering adjacent containers to cause the material to gravitate in and out of said containers successively.

15. A machine for treating material comprising a plurality of tanks arranged in succession and adapted to contain liquids, a plurality of tiltable containers adapted to be lowered into and raised from respective tanks, the container for each tank being mounted to tilt in the opposite direction from the container in the next successive tank, all of said containers being tiltable in planes substantially at right angles to the general direction in which said tanks are successively arranged, the containers being tiltable so that each container can be tilted above the next adjacent container, whereby the material in the raised container is discharged by gravity, and means for deflecting the material from the raised container into the adjacent lowered container.

16. A machine for treating material comprising two substantially horizontal opposed rows of containers arranged in staggered relationship, tanks adapted to receive liquid and arranged below respective containers, means for lowering and raising the containers into and out of respective tanks, the containers of one row being adapted to be raised above its respective tank while the adjacent container of the other row is lowered into its respective tank, and means for guiding the material in the raised container of one row for gravity discharge into the lowered adjacent container of the other row, whereby said material can be made to follow a zig-zag course between the two rows and through the tanks in succession.

ERICH R. ZADEMACH.